United States Patent
Hara (10) Patent No.: US 8,526,039 B2
(45) Date of Patent: Sep. 3, 2013

(54) IMAGE PROCESSING APPARATUS, AND CONTROL METHOD THEREOF AND PROGRAM

(75) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 12/784,808

(22) Filed: May 21, 2010

(65) Prior Publication Data

US 2010/0328715 A1 Dec. 30, 2010

(30) Foreign Application Priority Data

Jun. 30, 2009 (JP) .................................. 2009-156328

(51) Int. Cl.
*G06F 3/12* (2006.01)
(52) U.S. Cl.
USPC .................... 358/1.15; 358/1.13; 358/1.16
(58) Field of Classification Search
USPC .............. 358/1.13, 1.15, 1.16, 401, 402, 403; 710/4, 22, 23, 26, 27, 29; 711/101, 111, 711/112, 115, 117, 147, 158, 167
See application file for complete search history.

(56) References Cited

U.S. PATENT DOCUMENTS

| 5,878,198 | A | 3/1999 | Yuasa et al. |
| 5,911,049 | A | 6/1999 | Watanabe |
| 7,016,065 | B2 | 3/2006 | Hara |
| 2004/0196485 | A1 | 10/2004 | Hikichi et al. |
| 2010/0211743 | A1 | 8/2010 | Hara |

FOREIGN PATENT DOCUMENTS

JP 9-34609 B2 2/1997

*Primary Examiner* — Vu B Hang
(74) *Attorney, Agent, or Firm* — Fitzpatrick, Cella, Harper & Scinto (57) ABSTRACT

The present invention provides an image processing apparatus that realizes fast image processing in a distribution system equipped with a single mass storage device that reduces the cost for required hardware, and a method for controlling such an image processing apparatus. To accomplish this, the image processing apparatus includes a mainboard, a subboard connected to the mainboard via a bus, and a hard disk 6 that is connected to the subboard and indirectly connected to the mainboard via the subboard and that stores image data. When an access request to the hard disk is generated, in the case of data transfer between the hard disk and the mainboard, normal access is employed. On the other hand, fast access is employed in the case of data transfer between the hard disk and the subboard.

9 Claims, 10 Drawing Sheets

IMAGE PROCESSING APPARATUS, AND CONTROL METHOD THEREOF AND PROGRAM

BACKGROUND OF THE INVENTION

1. Field of the Invention

The present invention relates to an image processing apparatus, and a control method and program thereof.

2. Description of the Related Art

Image processing apparatus such as multifunction peripherals now have, in addition to a function that processes a large number of images at high speed, a function that incorporates a general-purpose PC server function and simultaneously runs multiple general-purpose applications. Such an image processing apparatus independently includes, as a hardware configuration, a stand-alone general-purpose PC system for implementing the general-purpose PC server function and a real-time image processing system. This is to maximize the performance of respective functions.

For example, Japanese Patent Laid-Open No. 09-34609 has proposed an image processing apparatus that employs a low-cost general-purpose PC technique with high functionality obtained by connecting a printer control board to a motherboard of a general-purpose PC via a general-purpose PCI bus. Ordinary general-purpose PCs must have a storage device. Accordingly, in the image processing apparatus disclosed in Japanese Patent Laid-Open No. 09-34609, a storage device is provided on the motherboard of the general-purpose PC and exchanges image data via the PCI bus.

However, the above conventional technique has the following problems. The performance of an image processing apparatus as described above depends on the performance of the general-purpose bus that connects two systems. In other words, no problem arises when processing relatively small image data, such as monochrome images and low-resolution color images, at low speed, but when processing high quality color images at high speed, there is concern that problems might arise such as bus bandwidth-related problems and an increase in transfer buffer size.

In addition, in the case of an image processing apparatus in which another CPU system is installed at the end of the general-purpose PCI bus, a large amount of hard disk space is used to perform communication between the CPUs and to implement various server functions on the general-purpose PC side. Furthermore, because the operating system sequentially accesses files by using a queued access method, there is also a possibility that the performance of image input/output might be lowered due to waiting for disk I/O. One of the methods to solve such problems is to provide a hard disk dedicated to image storage on the expansion board side. However, when a plurality of hard disks are provided, problems arise such as an increase in failure rate and an increase in cost.

SUMMARY OF THE INVENTION

The present invention enables realization of an image processing apparatus that realizes fast image processing in a distribution system equipped with a single mass storage device and that reduces the cost for required hardware, and a method for controlling such an image processing apparatus.

One aspect of the present invention provides an image processing apparatus comprising: a first control unit that performs overall control of the image processing apparatus; a second control unit that is connected to the first control unit via a bus and that has an image processing function performing an image process for image data; and a storage unit that is connected to the second control unit and indirectly connected to the first control unit via the second control unit, and that stores the image data; wherein the first control unit comprises: a determination unit that determines, when an access request to access the storage unit is generated, whether the access request is a request for data transfer between the first control unit and the storage unit or a request for data transfer between the second control unit and the storage unit; and an access unit that, in a case where the determination unit has determined that the access request is a request for data transfer between the first control unit and the storage unit, accesses the storage unit in an order that the access request was generated, and that, in a case where the determination unit has determined that the access request is a request for data transfer between the second control unit and the storage unit, accesses the storage unit by prioritizing the access request irrespective of the order that the access request was generated.

Another aspect of the present invention provides a method for controlling an image processing apparatus including: a first control unit that performs overall control of the image processing apparatus; a second control unit that is connected to the first control unit via a bus and that has an image processing function performing an image process for image data; and a storage unit that is connected to the second control unit and indirectly connected to the first control unit via the second control unit, and that stores the image data, the method comprising: determining, when an access request to access the storage unit is generated, whether the access request is a request for data transfer between the first control unit and the storage unit or a request for data transfer between the second control unit and the storage unit; and accessing, in a case where it has been determined in the determination step that the access request is a request for data transfer between the first control unit and the storage unit, the storage unit in an order that the access request was generated, and in a case where it has been determined in the determination step that the access request is a request for data transfer between the second control unit and the storage unit, the storage unit by prioritizing the access request irrespective of the order that the access request was generated, the determining and the accessing being performed by the first control unit.

Still another aspect of the present invention provides a computer-readable storage medium storing a computer program for causing a computer to execute the method for controlling the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Configuration of Image Processing Apparatus

Figure 1:
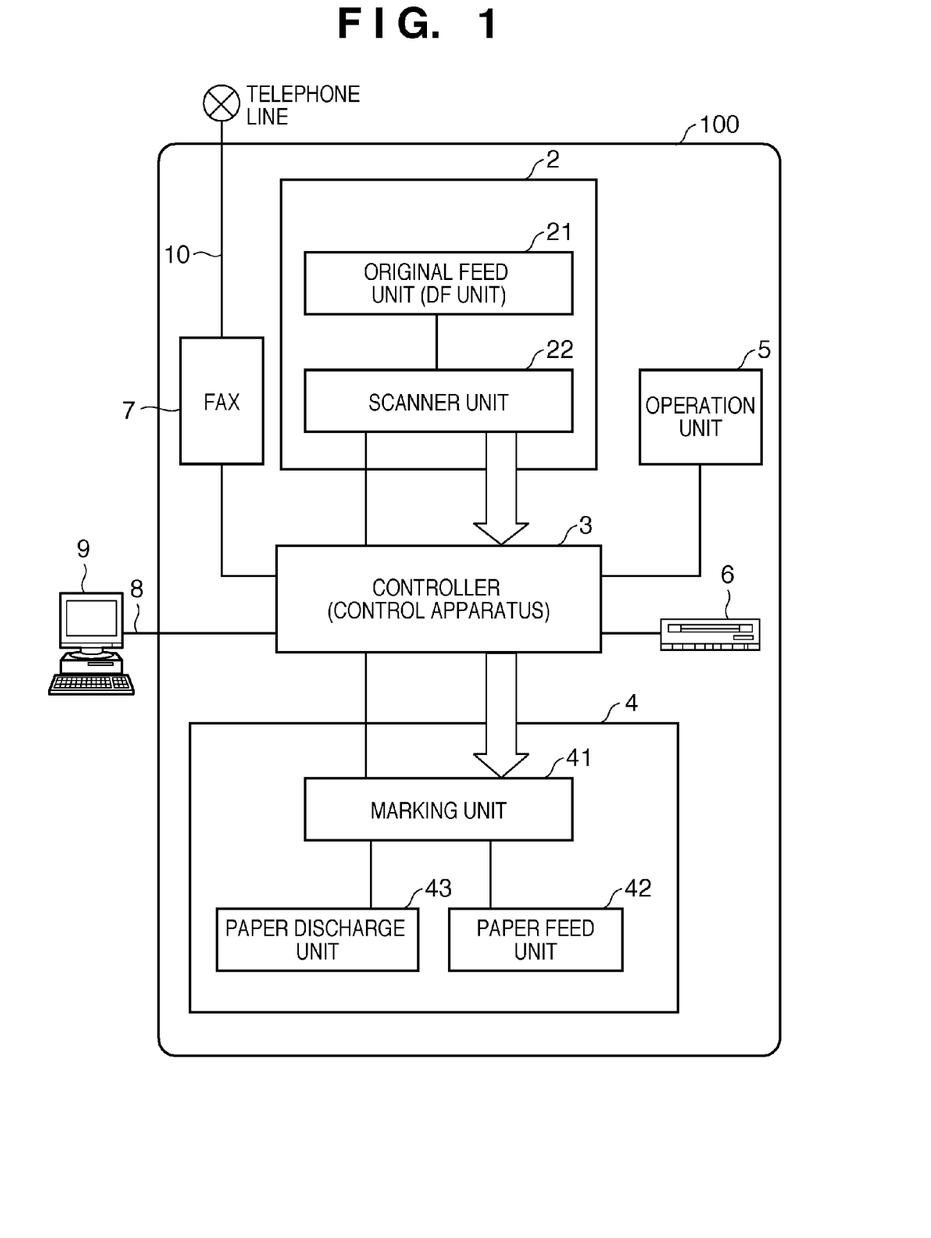
FIG. 1 is a diagram showing an example of a configuration of an image processing apparatus 100 according to an embodiment of the present invention.

An image processing apparatus 100 according to the present embodiment will be described first with reference to FIG. 1. It should be noted that the present embodiment will be described in the context of the image processing apparatus 100 being a multifunction peripheral that has a copy function, a facsimile function, a printer function, and so on, but the present invention is not limited thereto.

The image processing apparatus 100 is connected to a host computer 9 via a LAN 8 such as the Ethernet®. The image processing apparatus 100 includes a reader apparatus (reader unit) 2 that reads image data, a printer apparatus (printer unit) 4 that prints image data, an operation unit 5, a storage unit (HDD) 6, and a controller (control apparatus) 3 that controls the reader unit 2, the printer unit 4, the operation unit 5 and the storage unit 6. The operation unit 5 includes a keyboard with which image data is input/output and a liquid crystal panel for displaying/setting image data and various functions. The storage unit 6 stores image data read through control of the reader unit 2 and image data generated from code data received from the host computer 9 via the LAN 8. The controller 3 is connected to and controls the respective constituent elements.

The reader unit 2 includes an original feed unit 21 that conveys an original, and a scanner unit 22 that optically reads the original and converts the read original to image data in the form of an electric signal. A FAX unit 7 transmits and receives facsimile data via a telephone line 10. The printer unit 4 includes a paper feed unit 42 that has a plurality of paper feed cassettes for holding sheets and a marking unit 41 that transfers and fixes image data onto sheets. The printer unit 4 further includes a paper discharge unit 43 that sorts and staples printed sheets and discharge them to the outside.

The controller 3 controls the reader unit 2 to read original image data, and controls the printer unit 4 to provide a copy function that prints the image data on sheets. In addition, a scanner function that converts image data read by the reader unit 2 to code data and transmits the code data to the host computer 9 via the network 8, a printer function that converts code data received from the host computer 9 via the network 8 to image data and outputs the image data to the printer unit 4 to print the image data, and other functional blocks are provided.

The main functions of the image processing apparatus 100 include a copy function, an image transmission function, an image save function, an image print function, and a facsimile receiving function. The copy function is to store image data input from the reader unit 2 on the hard disk 6 and print the image data with the printer unit 4. The image transmission function is a function that transmits image data input from the reader unit 2 to the host computer 9 via the LAN 8. The image save function is a function that stores image data input from the reader unit 2 on the hard disk 6 and transmits or prints the image data as appropriate. The image print function is a function that analyzes, for example, a page description language transmitted from the host computer 9 and prints the page description language with the printer unit 4. The facsimile receiving function is a function in which the FAX unit 7 receives image data from the telephone line and the image data is printed by the printer unit 4 or saved on the hard disk 6. It is also possible to save data read from the scanner unit 22 on the hard disk 6 and transmit the data to the telephone line via the FAX unit 7. These functions can be executed apparently simultaneously by exclusively controlling each hardware device.

Controller 3

Figure 2:
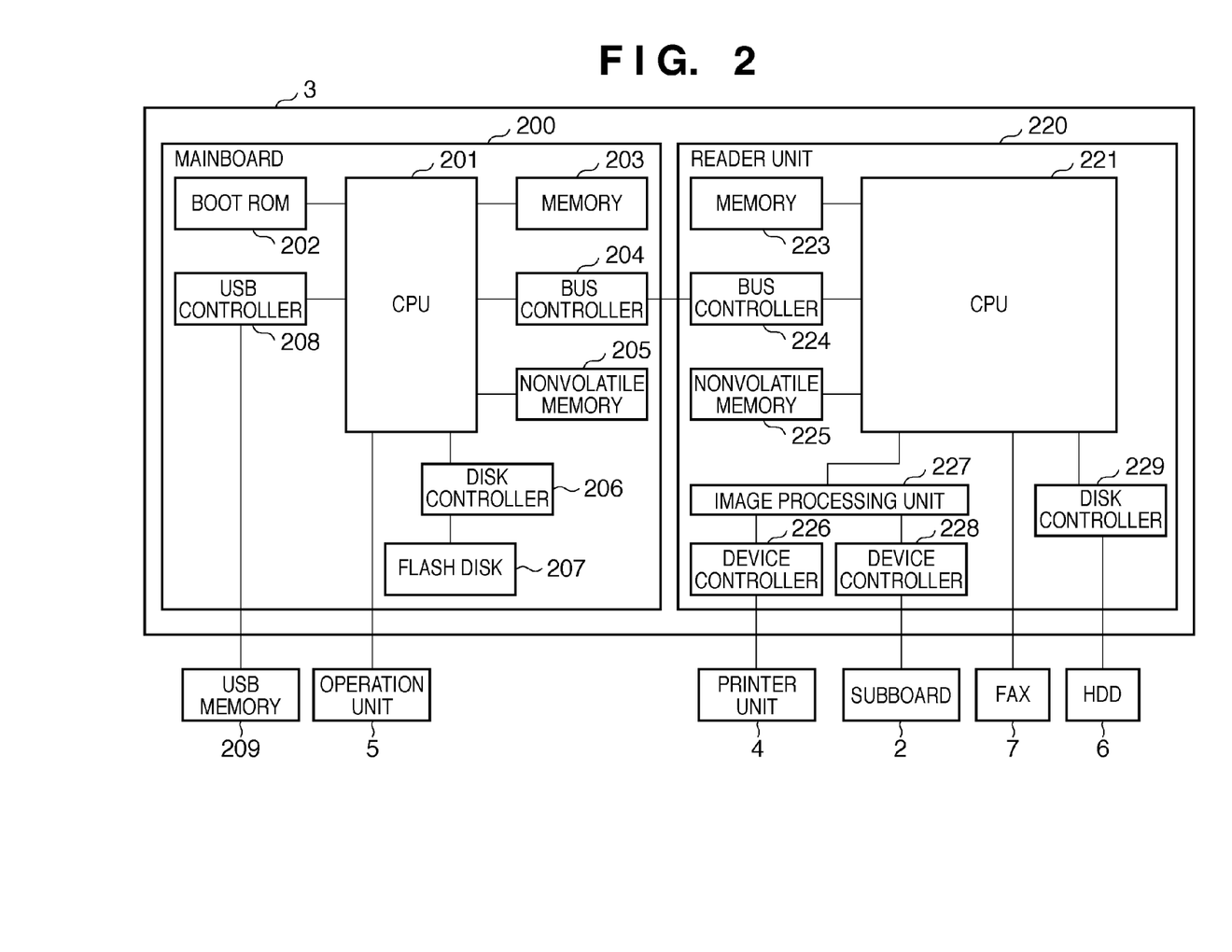
FIG. 2 is a diagram showing a hardware configuration of a controller 3 according to the embodiment of the present invention.

A hardware configuration of the controller 3 of the image processing apparatus 100 will be described next with reference to FIG. 2. The components common to those of FIG. 1 are given the same reference numbers. FIG. 2 shows a simplified diagram. For example, CPUs 201 and 221, which will be described later, include multiple CPU peripheral hardware components including a chipset, a bus bridge, a clock generator and so on, but they are not illustrated for the sake of simplicity. The controller 3 includes a mainboard 200 and a subboard 220. The mainboard 200 is a control substrate that functions as a first control unit and that performs overall control of the image processing apparatus 100. The subboard 220 is a control substrate that functions as a second control unit and that controls functions that require fast image processing among the functions of the image processing apparatus 100.

The mainboard 200 is a so-called general-purpose CPU system, which includes a CPU 201 that controls the entire mainboard 200, a boot ROM 202 that includes a boot program, and a memory (first storage unit) 203 that is used by the CPU 201 as a work area. The mainboard 200 also includes a bus controller 204 that has a bridge function for connecting to an external bus, and a nonvolatile memory 205, which may be a memory backed up by a battery or the like. The mainboard 200 further includes a flash disk (SSD or the like) 207 that is a relatively small capacity storage device configured with a semiconductor device, a disk controller 206 that controls the flash disk 207, and a USB controller 208 that controls a USB memory 209. The mainboard 200 is connected to the USB memory 209 and the operation unit 5 as shown in FIG. 2.

The subboard 220 is configured with a relatively small general-purpose CPU system and image processing hardware. The subboard 220 includes a CPU 221, a memory (second storage unit) 223 that is used by the CPU 221 as a work area, a bus controller 224 that has a bridge function for connecting to an external bus, and a nonvolatile memory 225. The subboard 220 further includes an image processing unit 227 that performs real-time digital image processing, device controllers 226 and 228, and a disk controller 229. The subboard 220 is connected to the printer unit 4, the reader unit 2, the FAX unit 7 and the hard disk 6 as shown in FIG. 2. The reader unit 2 and the printer unit 4 described above exchange digital image data with the image processing unit 227 via the device controllers 226 and 228, respectively. The FAX unit 7 is controlled directly by the CPU 221. The hard disk 6 is controlled by the disk controller 229.

As described above, in the image processing apparatus 100 of the present embodiment, the hard disk 6 as a main mass storage device is connected on the subboard 220 side, and is indirectly connected to the mainboard 200 via the bus controllers 224 and 204. Accordingly, the image processing apparatus 100 of the present embodiment realizes fast access to the hard disk 6 for the processing on the subboard 220 side that requires relatively fast image transfer. The disk controller 229 is a storage controller (device whose input and output can be seen via the device bus bridge) located at the end of, for example, the PCI controller as viewed from the CPU 201. In addition, in the present embodiment, the CPU 221 is configured to not operate the disk controller 229 and the hard disk 6.

An operation of the controller 3 will be described next, taking a copy function as an example. When a user issues an instruction to make a copy through the operation unit 5, the CPU 201 sends an image read command to execute a reading process to the reader unit 2 via the CPU 221. In response, the reader unit 2 optically scans the original to convert it to digital image data, and inputs the digital image data to the image processing unit 227 via the device controller 228. The image processing unit 227 stores the image data in the memory 223 via the CPU 221, using DMA.

When the CPU 201 confirms that a certain amount or all of the digital image data has been stored in the memory 223, the CPU 201 issues a print instruction to the printer unit 4 via the CPU 221. The CPU 221 teaches the image processing unit 227 the location of the image data in the memory 223. Then, the image data in the memory 223 is transmitted to the printer unit 4 via the image processing unit 227 and the device controller 226 in accordance with a synchronization signal from the printer unit 4, and printed on a sheet by the printer unit 4.

In the case of printing a plurality of copies, because the CPU 201 reads the original only once, the CPU 201 saves the image data in the memory 223 on the hard disk 6. Specifically, the CPU 201 temporarily transfers the image data in the memory 223 to a RAM accessible by the hard disk 6 so as to save the image data on the hard disk 6. Accordingly, for the second and subsequent copies, the image data is read from the hard disk 6 and printed by the printer unit 4.

Memory Map

A memory map of the CPU 201 shown in FIG. 2 will be described next with reference to FIG. 4. Reference numeral 400 is a virtual memory space (area) of the CPU 201. Reference numeral 410 is a physical memory space of the CPU 201. Reference numeral 420 is a memory space of the bus controllers 204 and 224. The present embodiment will be described using a widely used PCI bus. Reference numeral 430 is a memory map of the CPU 201.

A virtual memory space 401 discretely corresponds to a physical memory space 411 via a virtual memory page table. Reference numeral 402 is an area allocated to the PCI, which is configured so as to be capable of referring to a memory area 433 of the CPU 201. Reference numeral 431 is a physical memory of the CPU 201. Although 431 is shown apart from the physical memory 433, these areas are usually configured as a single area. Reference numeral 432 is an I/O area allocated to the PCI space. A physical memory space 411 of the CPU 201 can be referred to by referring to the memory of the I/O area 432. Such settings can be made by setting the bus controllers 204 and 224 relative to each other, whereby it is possible to construct a system in which they can refer to each other's memory areas.

Image Data Transfer Sequence According to Comparative Example

Figure 5:
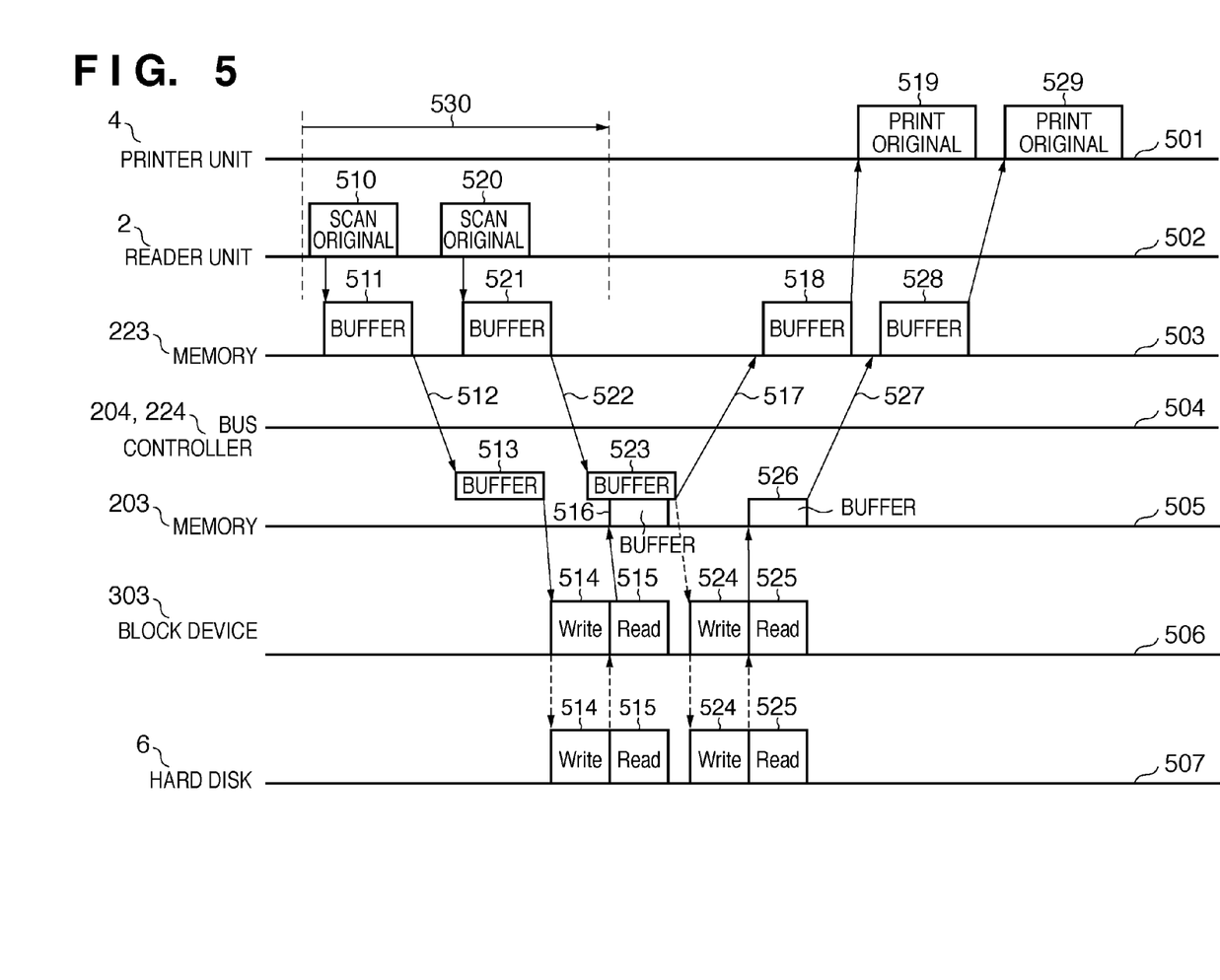
FIG. 5 is a diagram showing an image data transfer sequence according to a comparative example.

An image data transfer sequence configured by changing the configuration shown in FIG. 2 by connecting the hard disk 6 to the disk controller 206 of the mainboard 200 will be described now with reference to FIG. 5. The changed configuration is a conventionally widely used configuration. Accordingly, the transfer sequence described below will serve as a transfer sequence according to a comparative example. Reference numeral 501 of FIG. 5 indicates the timing of the operation of the printer unit 4. Reference numeral 502 indicates the timing of the operation of the reader unit 2. Reference numerals 503 and 505 respectively indicate the timing of reading and writing data from and to buffers in the memories 223 and 203. Reference numeral 504 indicates the timing of the operation of the bus controllers 204 and 224. Reference numeral 506 indicates the timing of reading and writing data of a block device 303, which will be described later. Reference numeral 507 indicates the timing of reading and writing data of the hard disk 6 whose connection has been changed to the mainboard 200 side.

Here, a sequence for copying a plurality of copies of an original, each copy being composed of a plurality of sheets will be described. The original feed unit 21 scans the original only once so as not to damage the original, and saves the obtained image data on the hard disk 6. The saved image data is asynchronously read from the hard disk 6 as required according to the speed of the printer unit 4, and printed.

First, the reader unit 2 scans the originals (510), and the read image data is stored in a buffer 511 in the memory 223. Subsequently, in order to store the image data on the hard disk 6, the data in the buffer 511 is transferred to a buffer 513 in the memory 203. The transfer is performed via the bus controllers 204 and 224 as shown by an arrow 512.

Next, the CPU 201 requests the kernel to save the data stored in the buffer 513 on the hard disk 6. Through this operation, the data is written (514) into the block device 303. As used herein, "block device" refers to a service in which the kernel transfers data to the hard disk 6 or the like block by block, and generally provides functions that employ buffers block by block such as input/output, random access and search. If buffers run out of free space, the data in the buffers can be written into the hard disk 6 as appropriate. Accordingly, the data on 507 and 506 can be regarded as virtually equivalent.

For execution of a print process, the data written (514) into the block device 303 is read (515) from the block device 303 and stored (516) in a buffer 516 in the memory 203. After that, the data is transferred to a buffer 518 in the memory 223, and transmitted to the printer unit 4 to print the originals (519).

For the data transfer between the memory 223 and the memory 203 described above, DMA is primarily used, and the data transfer is performed using the mutual memory reference system described in connection to FIG. 4. The block device 303 serves as a cache for the hard disk 6 that is relatively slow, and therefore operates very effectively in file access such as reading and writing to the same location. However, such control is a system in which the kernel conceals the relationship between memory and storage, and therefore there is a problem with responsiveness in applications requiring real-time operation.

Three problems occur when attempting to maximize performance in such an image data transfer sequence. One is data transmission/reception between the memory 223 and the memory 203. This problem often occurs when general-purpose bus bridges for transmitting and receiving generic data are used, and the bus bandwidth is not ensured. For example, when data transmission/reception is performed with a device that transmits and receives images in real time such as a printer or scanner, there is a possibility of data overrun/underrun, and therefore the data must be stored in a buffer area whose bus speed is ensured. In other words, it is necessary to provide an additional buffer area having a relatively high bus speed.

The second problem is buffer volume. As shown in a range indicated by 530 in FIG. 5, a plurality of buffers are generated for the same image in the memories 223 and 203 within the same period of time. This is because it is necessary to secure the same amount of data area as that of the transfer source in the transfer destination before DMA transfer is performed.

The third problem is the block device 303. The block device has a request queue configuration, which is shown by 303 in FIG. 3B described later. In other words, storage requests are placed in a request queue in the order they are generated within the kernel, and sequentially processed according to the queue. For example, in the case of the target being a low-speed device such as a hard disk, if an application frequently accesses the hard disk, numerous requests are stacked in the request queue. Accordingly, when the application exchanges image data with the hard disk via the block device in such a state, instantaneous access might not be possible.

Image Data Transfer Sequence According to Present Embodiment

Figure 3A:
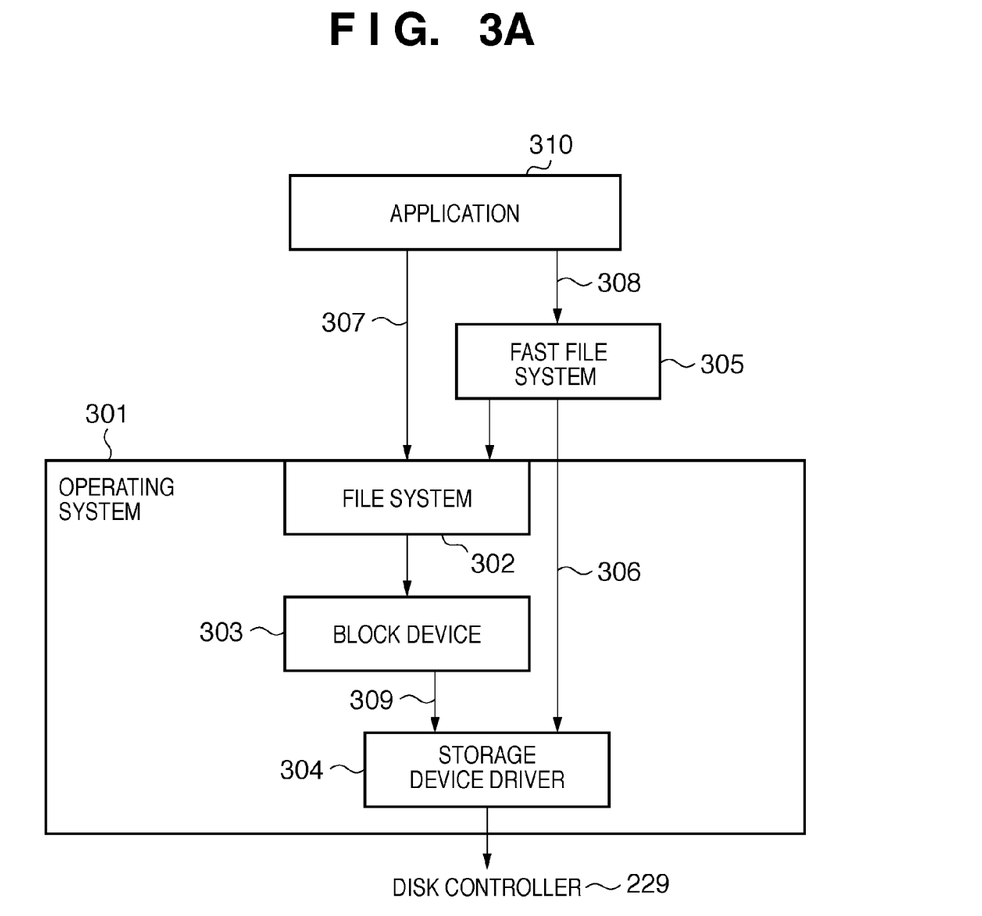
FIG. 3A is a conceptual diagram of software according to the embodiment of the present invention.

With the configuration of the controller 3 according to the present embodiment shown in FIG. 2, it is possible to provide an image processing apparatus 100 that overcomes the above problems. First, two different methods for accessing the hard disk will be described with reference to FIG. 3A. FIG. 3A is a conceptual diagram of software. Here, an example will be described in which the functions described below are implemented by software, but the present invention is not limited thereto, and the functions may be implemented by hardware, or a combination of software and hardware.

Normal access will be described first as a first access method. Normal access is used to access data other than image data that requires fast access. An application 310 accesses a file system 302 of an operating system 301 via a path 307. The file system 302 determines a physical location in the disk (generally, an LBA address), and issues an access request to the block device 303. The kernel issues a request to a storage device driver 304 via a path 309 as appropriate. The storage device driver 304 accesses the hard disk 6 via the disk controller 229. In this manner, with normal access, the hard disk 6 is accessed in the order of the request queue of the block device 303 provided by the mainboard 200 (or in other words, in the order access requests are generated).

Next, fast access will be described as a second access method. Fast access is used to access image data that requires fast access in order to ensure productivity of the printer unit 4, the reader unit 2 and the like. Such data access is used in, for example, a reading process for reading images from originals with the reader unit 2 or in an image forming process (print process) for forming images on recording material in accordance with image data with the printer unit 4. Fast access is implemented by a fast file system 305 that has been expanded so as to cope with fast access. In addition, fast access does not employ the request queue used in normal access, so access is made directly to the hard disk 6.

The application 310 accesses the fast file system 305 via a path 308. The fast file system 305 determines whether the transfer destination of the image data is the subboard 220 or the mainboard 200. If the transfer destination is the mainboard 200, the fast file system 305 requests access to the existing file system 302, and after that, the same operation as normal access is performed. If, on the other hand, the transfer destination is the subboard 220, the fast file system 305 issues a file access request to the storage device driver 304 via a direct system call (for example, ioctl or the like) fast access I/F 306. The storage device driver 304 prioritizes the process received via the fast access I/F 306. In other words, the process is performed with high priority without waiting for the order control from the request queue of the block device 303.

Figure 3B:
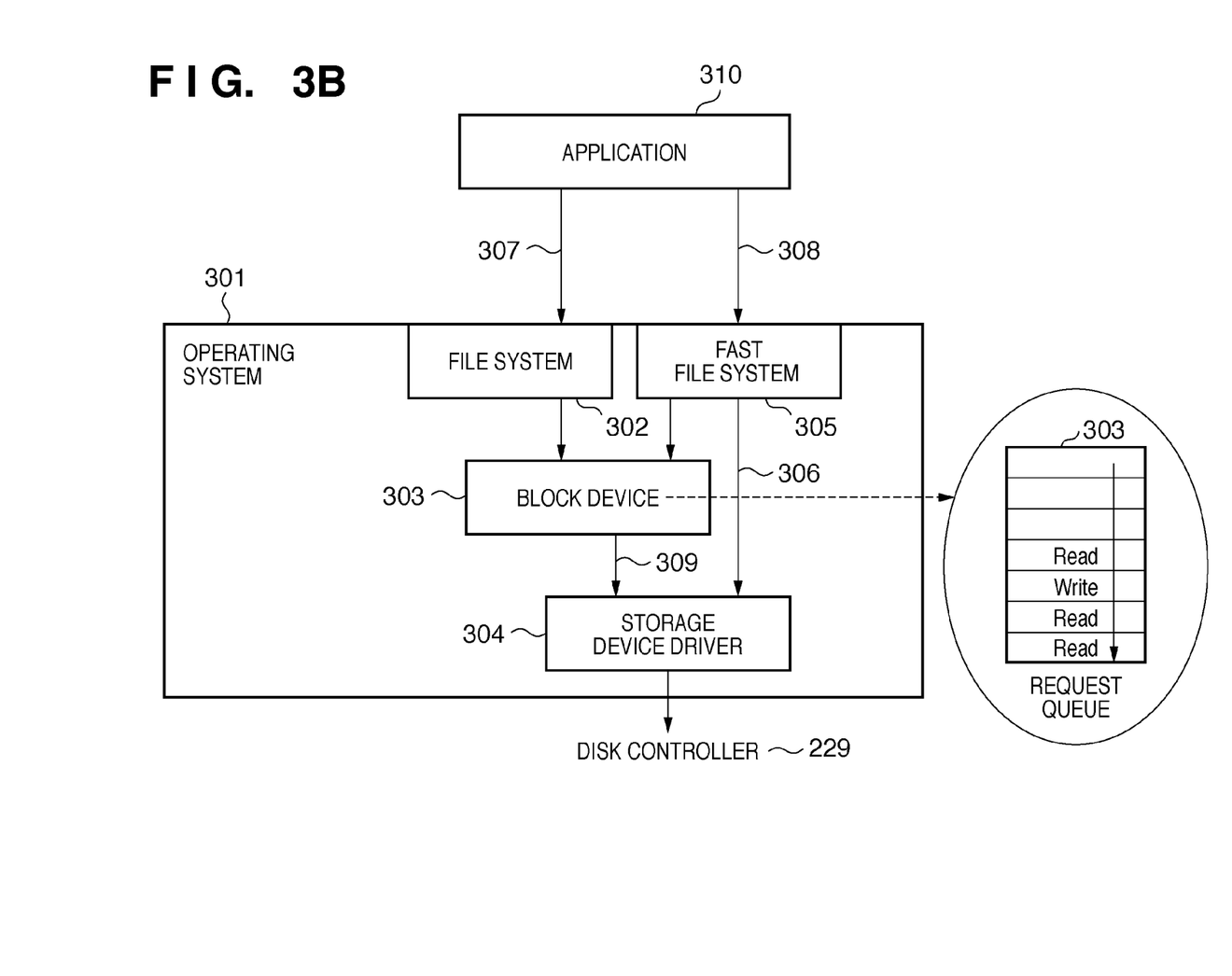
FIG. 3B is a diagram showing a variation of FIG. 3A.

FIG. 3B shows a variation of FIG. 3A. In a configuration shown in FIG. 3B, the fast file system 305 is built into the operating system 301. Because the fast file system 305 is built into the operating system 301, requests can be made directly to the block device 303. Control can be performed in the same manner as that of the configuration of FIG. 3A.

Figure 8:
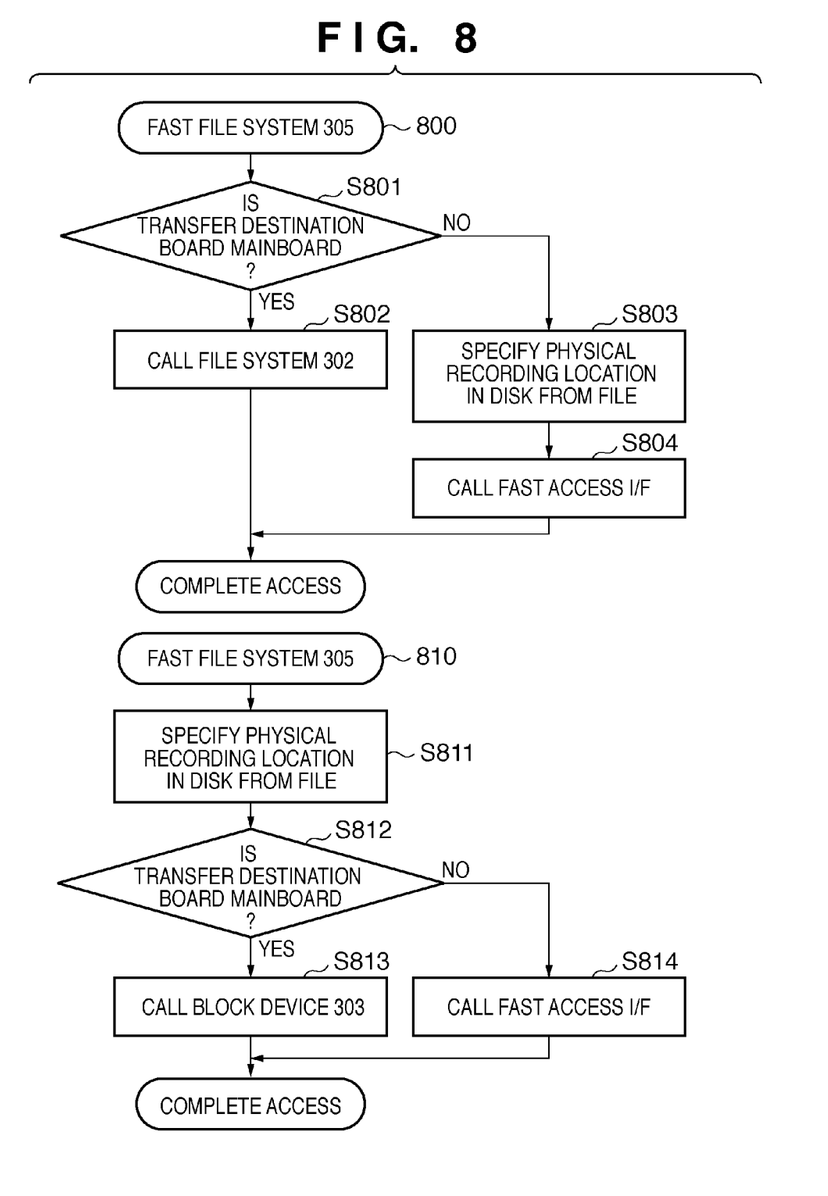
FIG. 8 is a flowchart showing a processing procedure of a fast file system 305 according to the embodiment of the present invention.

Next, a processing procedure of the fast file system 305 according to the present embodiment will be described with reference to FIG. 8. A flowchart 800 illustrates a processing procedure of the fast file system 305 according to the configuration of FIG. 3A that has been expanded to a non-kernel area. A flowchart 810 illustrates a processing procedure of the fast file system 305 according to the configuration of FIG. 3B that has been expanded to a kernel area. The processes described below are performed by the CPU 201 of the mainboard 200 executing a program stored in the nonvolatile memory 205 or the like. In the following, the numbers after the letter "S" indicate step numbers.

First, the flowchart 800 will be described. In S801, the fast file system 305 determines whether the board as a transfer destination is the mainboard 200 or the subboard 220. Here, it is assumed that a read request has been issued as an access request to the hard disk 6, and therefore whether the transfer destination board is the mainboard 200 or the subboard 220 is determined. However, the present invention is not limited thereto, and it is also possible to cope with a write request to the hard disk 6. In this case, it is determined whether access requested by the access request requires data transfer between the mainboard 200 and the hard disk 6 or data transfer between the subboard 220 and the hard disk 6. If the transfer destination is the mainboard 200, the process advances to S802, where the fast file system 305 calls the file system 302, and the process ends. Through this, the same result as that of normal access can be obtained. If, on the other hand, it is determined in S801 that the transfer destination is the subboard 220, the process advances to S803, where the fast file system 305 calculates a physical address in the disk that needs to be accessed from the requested file. This is a general file system operation. After that, in S804, the fast file system 305 makes a request to the storage device driver 304 via the fast access I/F 306.

The flowchart 810 will be described next. In S811, the fast file system 305 specifies a physical recording location in the disk that needs to be accessed from the file as in S804. Next, in S812, the fast file system 305 determines whether the transfer destination board is the mainboard 200 or the subboard 220. If the transfer destination is the mainboard 200, the process advances to S813, where the fast file system 305 calls the block device 303 of the kernel, and the process ends. If, on the other hand, the transfer destination is the subboard 220, the process advances to S814, where the fast file system 305 makes a request to the storage device driver 304 via the fast access I/F 306.

Figure 7:
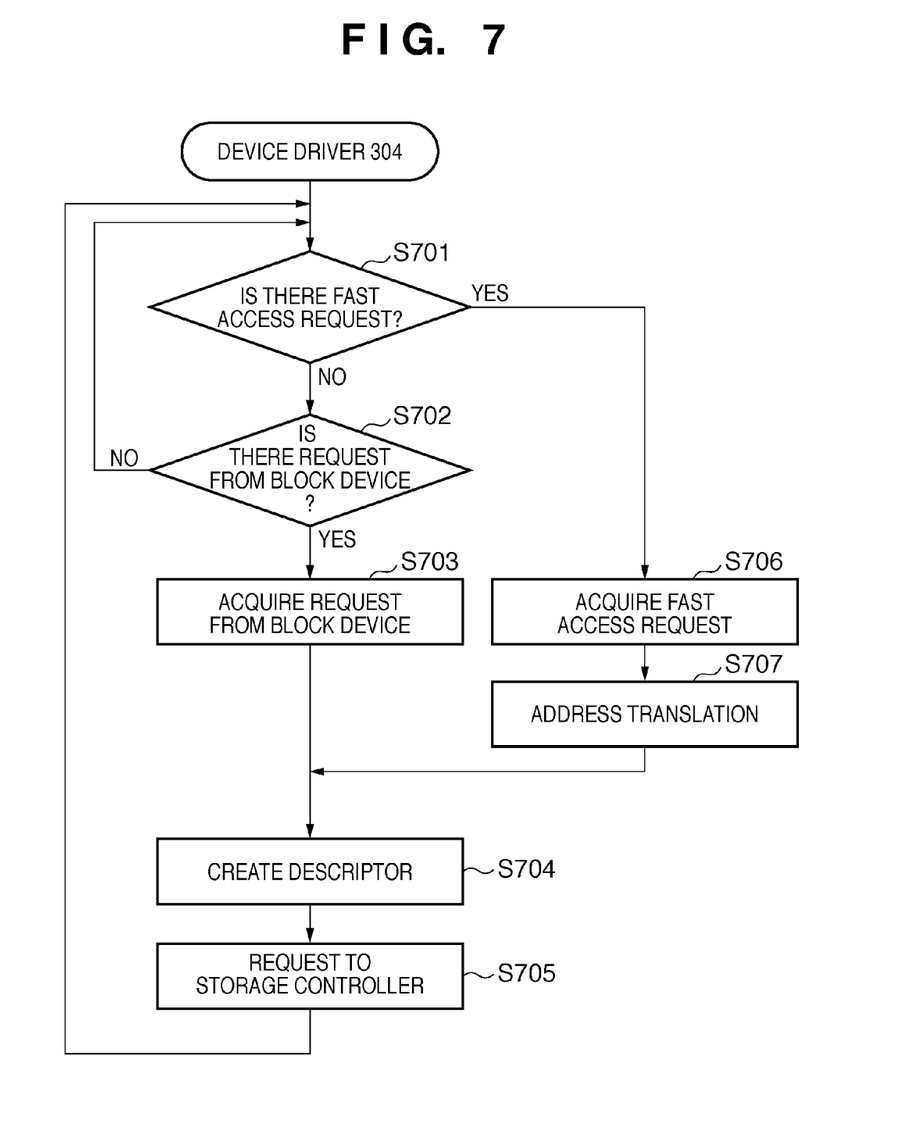
FIG. 7 is a flowchart showing a processing procedure of a storage device driver 304 according to the embodiment of the present invention.

A processing procedure of the storage device driver 304 will be described next with reference to FIG. 7. The process described below is performed by the CPU 201 of the mainboard 200 executing a program stored in the nonvolatile memory 205 or the like. In the following, the numbers after the letter "S" indicate step numbers.

First, in S701, the storage device driver 304 determines whether or not there is a fast access request from the fast access I/F 306. If there is no fast access request, the process advances to S702, where the storage device driver 304 determines whether or not there is a request from the block device 303. If there is a request from the block device 303, the process advances to S703, where the storage device driver 304 acquires an access request from the block device 303. In S704, the storage device driver 304 creates information (descriptor) for accessing the hard disk 6. After that, in S705, the storage device driver 304 makes a request to the storage controller, and thereby accesses the hard disk 6. Then, the process returns to S701.

If, on the other hand, it is determined in S701 that there is a fast access request, the process advances to S706, where the storage device driver 304 acquires the fast access request requested by the fast access I/F 306. Subsequently, in S707, the storage device driver 304 performs address translation, and the process advances to S704. After that, in the same manner as the operation with the block device 303, the process of S704 and S705 is executed to access the hard disk. As described above, in this flowchart, control is performed so as to execute fast access with higher priority than normal access (a block device request using a request queue). In other words, the storage device driver 304 corresponds to an access control unit.

The method for determining a transfer destination (transfer request) board performed in S801 and S812 will be described in detail. The determination method includes, for example, a method that separates the file system I/F, a method that changes volume name, a method that assigns a specific path name, and so on. The present embodiment employs the method described below, but the present embodiment is not limited to the determination method.

Figure 4:
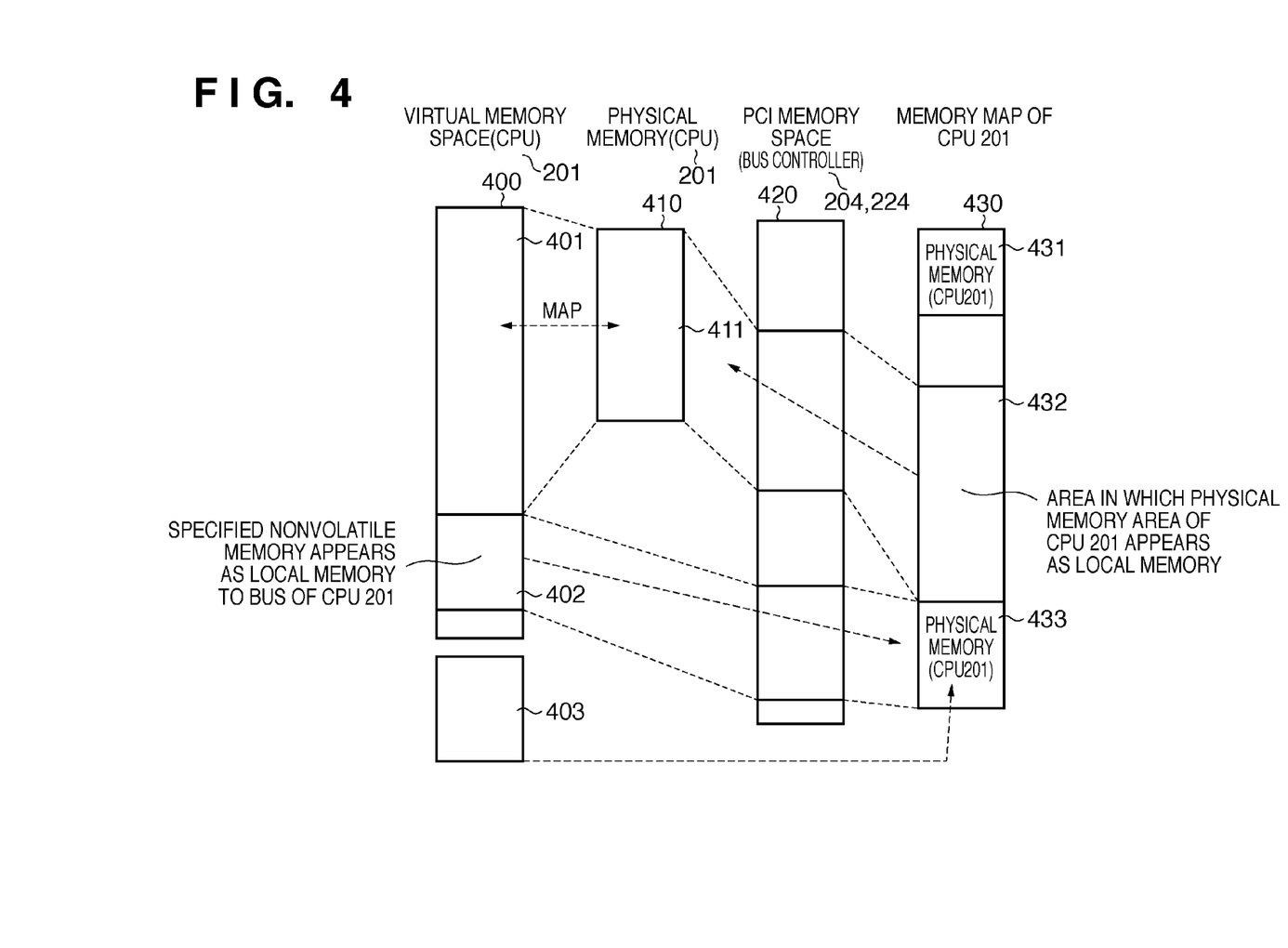
FIG. 4 is a diagram showing an example of a memory map of a CPU 201 according to the embodiment of the present invention.

The determination method of the present embodiment employs an area 403 shown in FIG. 4. The area 403 is a memory area other than a part of virtual memory area managed by the operating system, and is allocated as a mirror address of the area 433 for the subboard 220. In other words, the area 403 is associated with the address of the memory 223 of the subboard 220. This is to determine the transfer destination board, and the allocation is not performed with hardware. When transferring data to the area 433 provided in the memory map 430 of the CPU 201, the application 310 designates the area 403, which is an area that is not managed by the operating system, and calls the fast file system 305.

Figure 9:
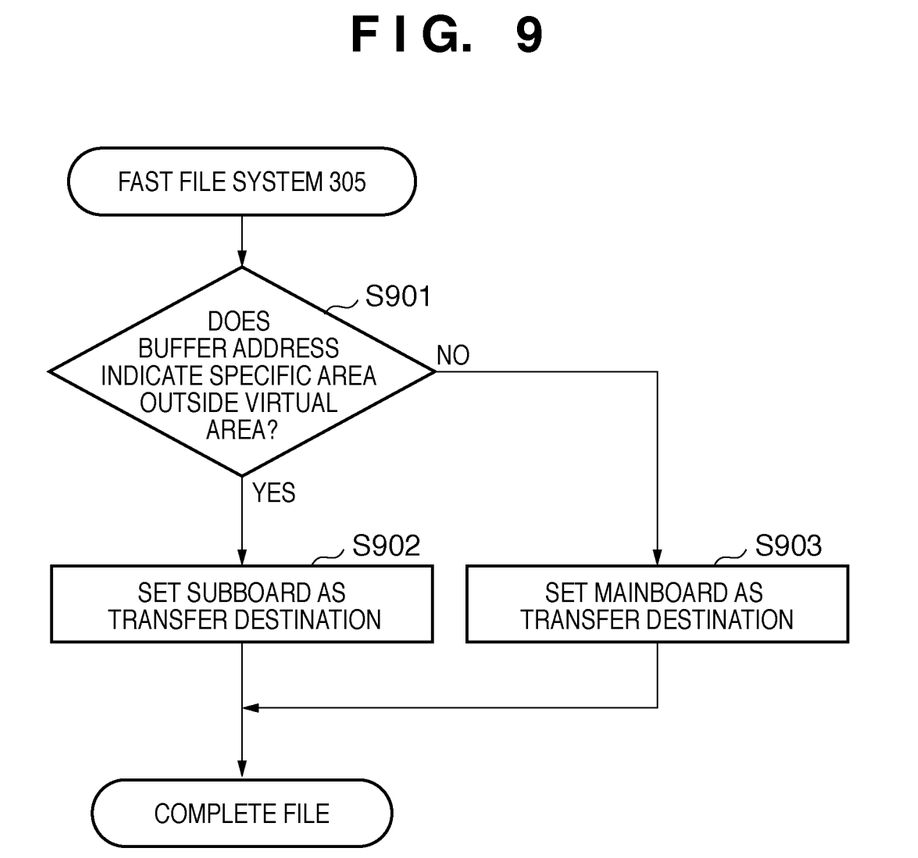
FIG. 9 is a flowchart showing a processing procedure for determining a board as a transfer destination according to the embodiment of the present invention.

The process of S801 and S812 will be described in detail with reference to FIG. 9. The process described below is performed by the CPU 201 of the mainboard 200 executing a program stored in the nonvolatile memory 205 or the like. In the following, the numbers after the letter "S" indicate step numbers.

In S901, the fast file system 305 determines whether or not the buffer address given to the file system indicates the area 403. It is also possible to determine whether or not the buffer address given to the file system indicates a virtual memory area of the kernel. If the buffer address indicates the area 403, the process advances to S902, where the fast file system 305 sets the subboard 220 as a transfer destination. If, on the other hand, the buffer address does not indicate the area 403, the process advances to S903, where the fast file system 305 sets the mainboard 200 as a transfer destination.

Next, the address translation process performed in S707 shown in FIG. 7 will be described in detail. Because a fast access request has been acquired in S706, a buffer address indicting the area 403 is notified. Because the area 403 is a virtual address, in S707, it is translated to the corresponding address in the area 433 for the subboard. The address is an address used by the disk controller 229 of the subboard 220 to refer to the memory 223. Through this address translation process, the disk controller 229 can perform direct data transfer between the hard disk 6 and the memory 223.

Next, an image data transfer sequence according to the present embodiment will be described with reference to FIG. 6. Reference numeral 601 of FIG. 6 indicates the timing of the operation of the printer unit 4. Reference numeral 602 indicates the timing of the operation of the reader unit 2. Reference numerals 603 and 606 respectively indicate the timing of reading and writing data from and to buffers in the memories 223 and 203. Reference numeral 604 indicates the timing of reading and writing data of the hard disk 6 of the present embodiment that is connected to the subboard 220 side. Reference numeral 605 indicates the timing of the operation of the bus controllers 204 and 224. Reference numeral 607 indicates the timing of reading and writing data of the block device 303.

It is assumed that the block device 303 has received a large number of read requests 621 and 624. Read 621 uses the hard disk 6 and reads data onto the memory 203. This operation is a path access through the file system 302, the block device 303, the storage device driver 304 and the disk controller 229 of FIG. 3A. The access is a file access that maximizes the utilization of the disk cache, which is one of the functions of the operating system that uses the existing block device.

Figure 6:
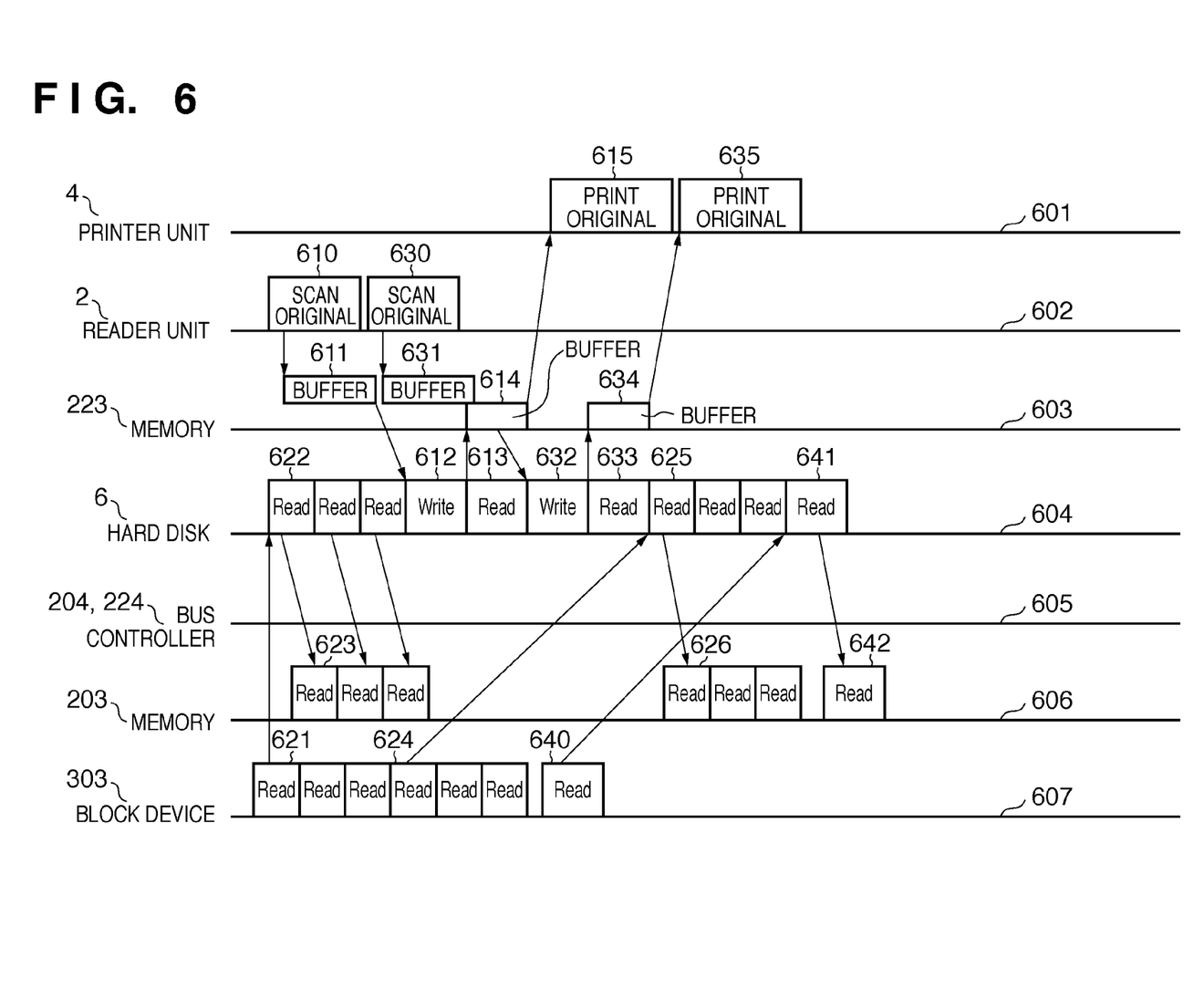
FIG. 6 is a diagram showing an image data transfer sequence according to the embodiment of the present invention.

In FIG. 6, a situation is assumed in which the reader unit 2 scans original (610) to read data into a buffer 611 in the memory 223, and the operation of writing the data onto the hard disk 6 conflicts with the previous file access. Write 612 is accessed from the fast access I/F 306 described above, and therefore is executed through the path including S706 and S707 prior to the read request 624. After that, similarly, Read 613 is executed on a buffer 614, and the image data is transferred to the printer unit 4 to print the original (615).

For operations from 630 to 635, the image data is preferentially transferred in the same manner as above. Read 624 is scheduled to be processed when the hard disk 6 becomes available, and therefore is read into a buffer 626 with a delay at the timing of Read 625. In other words, Write 612 and 632 and Read 613 and 633 that have high priority are executed in advance, and Read 625 corresponding to Read 624 is executed with a delay. Operations from 640 to 642 are also read with a delay.

As described thus far, the image processing apparatus 100 of the present embodiment can perform fast data transfer in a print process and a scan process that are controlled by the subboard 220 by providing the main hard disk 6 on the subboard 220 side. Specifically, the data transfer is performed within the subboard 220 without the involvement of the bus controllers 204 and 224. Accordingly, with the image processing apparatus 100 of the present embodiment, in a print process and a scan process that require fast data transfer, control is possible within a single board without the involvement of a plurality of boards, and therefore the problems described above can be overcome. For example, the image processing apparatus of the present embodiment is capable of transferring data directly from the hard disk 6 to the RAM 223 to which the image data output device is attached, and it is therefore possible to reduce the intermediate buffer volume, as well as reducing the bandwidth load on bus bridges. Accordingly, even when a plurality of image operation requests conflict, or when storage access requests from the server functions of the general-purpose PC conflict, it is possible to ensure image input/output performance. In addition, the image processing apparatus of the present embodiment can significantly reduce the bus load on general-purpose bus bridges, reduce the image transfer buffer, and reduce the number of storage devices, and therefore is cost advantageous.

The above embodiment can be modified in various ways. The above embodiment has been described using disk controllers and a hard disk, but the present invention can be equally applied with any kind of storage device. In such a case, the hardware corresponding to a disk controller can be a controller designed for the storage used. For example, in the case of using a fast storage device such as an SSD, there is a possibility that a problem with bandwidth between bus bridges might occur. However, the present invention can be effectively applied to such a case.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156328 filed on Jun. 30, 2009, which is hereby incorporated by reference herein in its entirety.

What is claimed is:

1. An image processing apparatus comprising:
a first control unit that performs overall control of the image processing apparatus;
a second control unit that is connected to the first control unit via a bus and that has an image processing function performing an image process for image data;
and a storage unit that is connected to the second control unit and indirectly connected to the first control unit via the second control unit, and that stores the image data;
wherein the first control unit comprises:
a determination unit that determines, when an access request to access the storage unit is generated, whether the access request is a request for data transfer between the first control unit and the storage unit or a request for data transfer between the second control unit and the storage unit;
and an access unit that, in a case where the determination unit has determined that the access request is a request for data transfer between the first control unit and the storage unit, accesses the storage unit in an order that the access request was generated, and that, in a case where the determination unit has determined that the access request is a request for data transfer between the second control unit and the storage unit, accesses the storage unit by prioritizing the access request irrespective of the order that the access request was generated;
and wherein at least one of the first control unit and the second control unit comprises a computer processor.

2. The image processing apparatus according to claim 1, wherein the access unit accesses the storage unit from the first control unit via the bus connecting the first control unit and the second control unit.

3. The image processing apparatus according to claim 1, wherein the access unit accesses the storage unit directly from the second control unit without accessing via the bus.

4. The image processing apparatus according to claim 1, wherein the first control unit executes an operating system that manages a part of virtual memory area,
the access unit designates an address of the virtual memory area managed by the operating system in a case where the determination unit has determined that the access request is a request for data transfer between the first control unit and the storage unit, and designates an address of a virtual memory area that is not managed by the operating system in a case where the access request is a request for data transfer between the second control unit and the storage unit, and
the determination unit determines whether or not the address designated by the access unit indicates the virtual memory area managed by the operating system, and thereby determines whether the access request is for data transfer between the first control unit and the storage unit or data transfer between the second control unit and the storage unit.

5. The image processing apparatus according to claim 4, further comprising:
a first storage unit that is a work area for the first control unit; and
a second storage unit that is a work area for the second control unit,
wherein the address that indicates the virtual memory area that is not managed by the operating system is associated with an address in the second storage unit.

6. The image processing apparatus according to claim 1, wherein the image processing function is a function that executes a reading process that reads an image from an original or an image forming process that forms an image on recording material in accordance with image data.

7. The image processing apparatus according to claim 1, wherein the first control unit and the second control unit are provided in different substrates.

8. A method for controlling an image processing apparatus utilizing a computer processor, the image processing apparatus including: a first control unit that performs overall control of the image processing apparatus; a second control unit that is connected to the first control unit via a bus and that has an image processing function performing an image process for image data; and a storage unit that is connected to the second control unit and indirectly connected to the first control unit via the second control unit, and that stores the image data, the method comprising:
determining, when an access request to access the storage unit is generated, whether the access request is a request for data transfer between the first control unit and the storage unit or a request for data transfer between the second control unit and the storage unit; and
accessing, in a case where it has been determined in the determination step that the access request is a request for data transfer between the first control unit and the storage unit, the storage unit in an order that the access request was generated, and in a case where it has been determined in the determination step that the access request is a request for data transfer between the second control unit and the storage unit, the storage unit by prioritizing the access request irrespective of the order that the access request was generated, the determining and the accessing being performed by the first control unit.

9. A non-transitory computer-readable storage medium storing a computer program for causing a computer to execute the method for controlling an image processing apparatus according to claim 8.

* * * * *